United States Patent
Su et al.

(10) Patent No.: US 10,607,273 B2
(45) Date of Patent: Mar. 31, 2020

(54) SYSTEM FOR DETERMINING AND DISPLAYING RELEVANT EXPLANATIONS FOR RECOMMENDED CONTENT

(71) Applicant: Google Inc., Mountain View, CA (US)

(72) Inventors: Jennifer Su, San Francisco, CA (US); Mark T. Rivera, Mountain View, CA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 15/392,059

(22) Filed: Dec. 28, 2016

(65) Prior Publication Data

US 2018/0182015 A1      Jun. 28, 2018

(51) Int. Cl.
*G06Q 30/06*      (2012.01)
*G06N 20/20*      (2019.01)
(Continued)

(52) U.S. Cl.
CPC ......... *G06Q 30/0631* (2013.01); *G06N 20/00* (2019.01); *G06N 20/10* (2019.01);
(Continued)

(58) Field of Classification Search
CPC .............. G06Q 30/0631; G06Q 50/01; G06Q 10/1053; G06N 20/00; G06N 20/10; G06N 20/20; H04L 67/02; G06F 16/9535
(Continued)

(56) References Cited

U.S. PATENT DOCUMENTS 6,370,510 B1    4/2002    McGovern et al.
7,555,441 B2    6/2009    Crow et al.
(Continued)

FOREIGN PATENT DOCUMENTS

CA      2484440              4/2005
CA      2925069 A1 *    3/2015    ......... G06Q 10/1053
(Continued)

OTHER PUBLICATIONS

Loannis Paparrizos et al., Machine Learned Job Recommendation, published Oct. 23-27, 2011, Chicago, Illinois , extracted from Google on Jul. 18, 2019.*
(Continued)

*Primary Examiner* — Yogesh C Garg
(74) *Attorney, Agent, or Firm* — Dority & Manning, P.A.

(57) ABSTRACT

Systems and methods for providing relevant explanations for recommended content are provided. In one embodiment, a computer-implemented method includes obtaining data indicative of one or more parameters associated with a user. The method includes determining recommended content for the user based at least in part on the one or more parameters associated with the user. The recommended content is associated with a recommended engagement for the user. The method includes generating an explanation for the recommended content for the user based at least in part on the one or more parameters associated with the user. The explanation is indicative of why the recommended engagement is recommended for the user. The method includes providing data indicative of the recommended content and the explanation for the recommended content for display on a user interface via a display device.

19 Claims, 5 Drawing Sheets

(51) Int. Cl.
*G06Q 50/10* (2012.01)
*H04L 29/08* (2006.01)
*G06N 20/00* (2019.01)
*G06N 20/10* (2019.01)

(52) U.S. Cl.
CPC ............. *G06N 20/20* (2019.01); *G06Q 50/10* (2013.01); *H04L 67/02* (2013.01)

(58) Field of Classification Search
USPC .......................................... 705/26.7; 706/12
See application file for complete search history.

(56) References Cited

U.S. PATENT DOCUMENTS

| | | | |
|---|---|---|---|
| 7,734,627 | B1 | 6/2010 | Tong |
| 7,761,320 | B2 | 7/2010 | Fliess et al. |
| 8,117,024 | B2 | 2/2012 | Dane |
| 8,438,137 | B2 | 5/2013 | Gold et al. |
| 8,601,019 | B1 | 12/2013 | Weininger et al. |
| 8,650,177 | B2 | 2/2014 | Skomoroch et al. |
| 9,298,724 | B1 | 3/2016 | Patil et al. |
| 2008/0065630 | A1 | 3/2008 | Luo et al. |
| 2008/0086366 | A1 | 4/2008 | Concordia et al. |
| 2009/0276415 | A1 | 11/2009 | Dane |
| 2013/0024464 | A1* | 1/2013 | Berner .............. G06F 17/30864 707/749 |
| 2013/0046704 | A1* | 2/2013 | Patwa .................... G06Q 10/06 705/321 |
| 2013/0218620 | A1 | 8/2013 | Liu et al. |
| 2014/0081928 | A1 | 3/2014 | Skomoroch et al. |
| 2016/0104067 | A1* | 4/2016 | Xu ........................ G06F 16/951 706/46 |
| 2016/0307158 | A1* | 10/2016 | Tang .................. G06Q 10/1053 |
| 2017/0004451 | A1* | 1/2017 | Gune ................. G06Q 10/1053 |
| 2017/0011312 | A1* | 1/2017 | Subramanian ... G06Q 10/06311 |
| 2017/0236073 | A1* | 8/2017 | Borisyuk .............. G06Q 50/01 706/12 |
| 2018/0067991 | A1* | 3/2018 | Agarwal ............. G06F 16/2455 |
| 2018/0107742 | A1* | 4/2018 | Kapoor ................. G06Q 50/01 |

FOREIGN PATENT DOCUMENTS

| | | |
|---|---|---|
| WO | WO 00/26839 | 5/2000 |
| WO | WO 01/004811 | 1/2001 |
| WO | WO 2005/038584 | 4/2005 |
| WO | WO 2008/034114 | 3/2008 |
| WO | WO 2010/009370 | 1/2010 |
| WO | WO 2016/053382 | 4/2016 |

OTHER PUBLICATIONS

Wenxing Hong et al. "A Job Recommender System Based on User Clustering", published 2013 in Academy Publisher, extracted from Google on Jul. 18, 2019.*

Barkley et al., "Pivot", 2015 Master's Project, University of California, Berkeley', 61 pages.

Carty, "Did Indeed Hide Your Job Postings? Deduplication Explained", www.retruitingblogs.com/profiles/blogs/did-indeed-hide-your-job-postings-deduplication-explained, retrieved on Nov. 30, 2016, 10 pages.

Facebook Screenshot of "produ", retrieved on Dec. 19, 2016, 1 page.

Javed et al., "Towards a Job Title Classification System", arXiv:1606.00917v1, 2016—4 pages.

Kivimaki et al., "A Graph-Based Approach to Skill Extraction from Text", Proceedings of the TextGraphs-8 Workshop, Seattle, Washington, Oct. 18, 2013, pp. 79-87.

Lamche et al., "Interactive Explanations in Mobile Shopping Recommender Systems", ACM Conference Series on Recommender Systems—Joint Workshop on Interfaces and Human Decision Making for Recommender Systems, Foster City, Silicon Valley, California, Oct. 6, 2014, 8 pages.

Li et al., "One Permutation Hashing", Proceedings of the $25^{th}$ International Conference on Neural Information Processing Systems, Lake Tahoe, Nevada, Dec. 3-6, 2012, 9 pages.

LinkedIn Screenshot of "pro", retrieved on Dec. 19, 2016, 1 page.

"Near-Duplicates and Shingling", http://nlp.stanford.edu/IR-book/html/htmledition/near-duplicates-and-shingling-1, retrieved on Nov. 30, 2016, 5 pages.

Pathak, "Combating Web Plagiarism and Improving Internet Safety by Authenticating Web Content", 2010 International Conference for Internet Technology and Secured Transactions, London, United Kingdom, Nov. 8-11, 2010, 6 pages.

Spirin et al., "Unsupervised Approach to Generate Informative Structured Snippets for Job Search Engines", Proceedings of the $22^{nd}$ International Conference on World Wide Web Companion, Rio de Janeiro, Brazil, May 13-17, 2013, pp. 203-204.

Tintarev et al., "A Survey of Explanations in Recommender Systems". Proceedings of the 2007 IEEE $23^{rd}$ Conference on Data Engineering Workshop, Istanbul, Turkey, Apr. 17-20, 2007, pp. 801-810.

Wikipedia, "MinHash", https://en.wikipedia.org/wiki/MinHash, retrieved on Dec. 19, 2016, 6 pages.

Zhao et al., "SKILL: A System for Skill Identification and Normalization", Proceedings of the Twenty-Seventh Conference on Innovative Applications of Artificial Intelligence, Austin, Texas, Jan. 25-30, 2015, pp. 4012-4017.

De Gemmis, "Deep Content Analytics Methods to Improve Transparency and Serendipity of Recommender Systems", Workshop on Semantics-Enabled Recommender Systems, Barcelona, Spain, Dec. 12, 2010, 58 pages.

* cited by examiner

SYSTEM FOR DETERMINING AND DISPLAYING RELEVANT EXPLANATIONS FOR RECOMMENDED CONTENT

FIELD

The present disclosure relates generally to generating and providing relevant explanations for content that is recommended to a user.

BACKGROUND

Users of many online products face a plethora of recommendations in the form of similar products—e.g. "People also viewed" type recommendations, as well as suggested content personalized for them—e.g. "Based on your preferences" type recommendations. Users trust recommender systems more to the extent that they believe the content is tailored to them. This is especially important when the context in which a recommendation is made is vague. For example, on product pages the context for making "People also viewed" recommendations is clear—it is people who also viewed the product a user is looking at. However, when an online system makes general recommendations outside of a specific context, a lack of clarity can decrease a user's trust in the recommendation.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing relevant explanations for recommended content. The method includes obtaining, by one or more computing devices, data indicative of one or more parameters associated with a user. The method includes determining, by the one or more computing devices, recommended content for the user based at least in part on the one or more parameters associated with the user. The recommended content is associated with a recommended engagement for the user. The method includes generating, by the one or more computing devices, an explanation for the recommended content for the user based at least in part on the one or more parameters associated with the user. The explanation is indicative of why the recommended engagement is recommended for the user. The method includes providing, by the one or more computing devices, data indicative of the recommended content and the explanation for the recommended content for display on a user interface via a display device.

Another example aspect of the present disclosure is directed to a computing system for providing relevant explanations for recommended content. The system includes one or more processors and one or more memory devices. The one or more memory devices store instructions that when executed by the one or more processors cause the one or more processors to perform operations. The operations include obtaining data indicative of one or more parameters associated with a user. The operations include determining recommended content for the user based at least in part on the one or more parameters associated with the user, the recommended content being associated with a recommended engagement for the user. The operations include generating an explanation for the recommended content for the user based at least in part on the one or more parameters associated with the user. The explanation is indicative of why the recommended engagement is recommended for the user. The operations include providing, for display on a user interface via a display device, data indicative of the recommended engagement and the explanation for the recommended engagement.

Yet another example aspect of the present disclosure is directed to one or more tangible, non-transitory computer-readable media storing computer-readable instructions that when executed by one or more processors cause the one or more processors to perform operations. The operations include obtaining data indicative of one or more parameters associated with a user. The one or more parameters include at least one of at least one of a work experience associated with the user, a user skill associated with the user, and online behavior associated with the user. The operations include determining a recommended engagement for the user based at least in part on the one or more parameters associated with the user. The operations include generating an explanation for the recommended engagement for the user based at least in part on the one or more parameters associated with the user. The operations include providing data indicative of the recommended engagement and the explanation for the recommended engagement for display on a user interface via a display device.

Other example aspects of the present disclosure are directed to systems, apparatuses, tangible, non-transitory computer-readable media, user interfaces, memory devices, and electronic devices for providing relevant explanations for recommended content.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing a user with an explanation for why certain content is being recommended to the user. For instance, a content recommendation system can recommend an engagement to a user, while also providing an explanation as to why the particular engagement was recommended for the user. An engagement can include a job (e.g., paid, unpaid, for hire, contracted, employment position, temporary position), a volunteer position, a contracted position, an arrangement to do something, an undertaking, a task undertaken for another (e.g., individual, entity), a hobby, etc. for the user. The content recommendation system can process a user's resume (e.g., an electronic version uploaded by the user), an online profile of the user, user search history, etc. to obtain one or more parameters associated with the user. Such parameters can include the user's work experience, the user's skill set, online behavior of the user, etc. The content recommendation system can determine a recommended engagement for the user based at least in part on the parameters. Additionally, the content recommendation system can generate an explanation as to why the recommended engagement is recommended for the user. For instance, the content recommendation system can identify that the user has technology skills in "C++" coding and work experience as a computer programmer (e.g., by processing a resume document uploaded by the user). The content recommendation system can recommend a job opening for a "Director of Software Development" position for the user because individuals familiar with C++ are commonly interested in such jobs and/or because people with computer programming experience often transition into a director position in the software development industry. To help illuminate this job opening for the user, the content recommendation system can provide data indicative of the recommended job and the corresponding explanation for display on a user interface. In this way, the content recommendation system can more easily alert the user of relevant user engagements (e.g., jobs), while also providing an explanation as to why the engagement is relevant to the user. This approach can help increase the user's understanding of the recommendation as well as increase the likelihood of the user selecting the recommended content.

More particularly, a content recommendation system (e.g., a web-based server system) can obtain data indicative of one or more parameters associated with a user. The parameter(s) associated with the user can include, for example, a work experience associated with the user, a user skill associated with the user, online behavior associated with the user, etc. To obtain such parameters, the content recommendation system can access one or more databases that store information associated with the user. The information can be uploaded by the user. For example, the content recommendation system can access an electronic version of the user's resume, an online profile associated with the user, one or more previous job applications associated with the user, data indicative of the user's web history (e.g., search history, clicks, pages visited, likes, dislikes, social media follows, check-ins, etc.). The content recommendation system can process such information to obtain the parameter(s) associated with the user. For example, the content recommendation system can process a resume associated with the user to extract one or more parameters from the resume (e.g., user skills in C++ programming, work experience as a computer programmer). In some implementations, the content recommendation system can infer one or more parameters for the user. For example, the content recommendation system can process the work experience (e.g., "handled web site programming tasks") included in a user's resume and/or an online profile to infer that the user likely has knowledge of Hyper Text Markup Language (HTML) commonly used to structure a web page.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The content recommendation system can determine recommended content for the user. The recommended content can be associated with a recommended engagement for the user, such as a recommended job, hobby, engagement, undertaking, etc. By way of example, the recommended content can include a job posting (e.g., included in an electronic document) that is associated with a job (e.g., recommended engagement). The job posting can include textual content associated with a job (e.g., "Director of Software Development" for Company A). The textual content can include one or more job characteristics associated with a job such as, for example, a job title, a location, a company, compensation, work environment, company overview, responsibilities, skills (e.g., preferred, recommended), etc. In some implementations, such content can be organized within the job posting as separate sections. For instance, the job posting can include one or more sections that indicate job skills required and/or preferred for the associated job. The content recommendation system can extract one or more job skills (e.g., "4+ years' experience in C++ preferred") from a job posting using a classifier model, as described will be further described herein.

The content recommendation system can determine the recommended content for the user based at least in part on the one or more parameters associated with the user. For instance, the content recommendation system can compare one or more of the parameters associated with the user to one or more job characteristics indicated in the job posting. The content recommendation system can determine the recommended engagement (e.g., job) based at least part on the comparison of the parameters associated with the user to one or more job characteristics indicated in the job posting. By way of example, the content recommendation system can compare a user skill extracted from the user's resume (e.g., C++ programming proficiency) to a job skill extracted from the job posting (e.g., 4+ years' experience in C++ preferred). In the event that the extracted user skills are related to, similar to, match, etc. the job skills, the content recommendation system can identify the job from the job posting as a recommended engagement (e.g., a recommended job) for the user.

Additionally, or alternatively, the content recommendation system can determine a recommended engagement for the user based at least in part on a common job transition. For instance, the content recommendation system can be configured to analyze a plurality of resumes, user profiles (e.g., of online job professional sites), job applications, etc. to determine a relationship between jobs within a certain industry and/or across industries. The content recommendation system can create a data structure (e.g., hierarchy, tree structure, other structure) that indicates the relatedness between different jobs types based at least in part on the analyzed data. The data structure can indicate the types of jobs typically held by an individual before transitioning and/or applying to a new job. The content recommendation system can utilize such a data structure to determine a potential job transition for the user.

The content recommendation system can determine a transition for the user based at least in part on one or more of the parameter(s) associated with the user. The transition (e.g., job transition) can be indicative of a transition from a current engagement associated with the user (e.g., the user's current job, a past job) to a new engagement (e.g., a new job, engagement not currently associated with the user). The content recommendation system can determine the recommended engagement (e.g., job) for the user based at least in part on the transition. For example, the content recommendation system can determine that individuals with computer programming experience often transition into director positions in the software development industry. In this way, the content recommendation system can leverage trends in common transitions (e.g., job transitions) to help recommend relevant user engagements (e.g., jobs) to a user.

The content recommendation system can generate an explanation for the recommended content for the user based at least in part on the one or more parameters associated with the user. The explanation can be indicative of why the recommended content (e.g., recommended engagement) is recommended for the user. For example, the content recommendation system can determine that a user may be interested in a job for the "Director of Software Development" with Company A based, at least in part, on the user's skill (e.g., C++ proficiency), work experience (e.g., as computer programmer), online behavior (e.g., search queries related to job openings in software development). The explanation as to why the recommended job is being recommended to the user can be that individuals familiar with C++ are commonly interested in jobs like a director position within the software development field. In this way, the explanation for the recommended content can be indicative of one or more of the parameters associated with the user (e.g., the user's skills associated C++ programming language). Additionally, or alternatively, the explanation for the recommended content can be indicative of the job transition. For example, the explanation can be that individuals with computer programming experience often transition into director positions in the software development industry.

In some implementations, the explanation can be based at least in part on a predefined explanation. For instance, the content recommendation system can access a database that includes a plurality of predefined explanations and/or templates for such explanations. The content recommendation system can access these predefined explanations to help generate its explanation as to why recommended content is being recommended for a specific user. By way of example, a predefined explanation can include the follow template for when the explanation is based at least in part on a user skill: "people familiar with <skill name> are interested in <jobs, tasks, engagements, etc.> like this."

The content recommendation system can provide data indicative of the recommended content and the explanation for the recommended content for display on a user interface via a display device. For instance, the content recommendation system can provide data indicative of the recommended job (e.g., a reference, a visual message, link to a job posting) and the explanation for the recommended job for display on a user interface via a display device of the user's computing device (e.g., laptop, tablet, phone). The explanation for the recommended job can be indicative of the transition from the job of the user to the new job (e.g., via textual message displaying "People with Computer Programming experience often transition into Director positions in the Software Development industry"). In some implementations, the content recommendation system can provide the data indicative of the recommended job for selection by the user via the user interface. For example, the recommended job can be associated with a link (e.g., hyperlink) to a corresponding job posting. The selection of the recommended job by the user (e.g., via a mouse click, tap) can cause the display of a job posting associated with the recommended job. In this way, the user can learn more about the recommended job, if desired. The provision of the explanation may cause the user to select a content associated with the recommended engagement which they might otherwise have overlooked as not being relevant to them. This may result in the user finding an engagement (e.g., job) in which they are particularly interested (which they otherwise would not have found) and so ending their searching session earlier than they may otherwise have done.

The act of a user searching for relevant content using, for instance, a web-based server system can be a time-consuming process, which all the while makes use of computational resources such as processing, bandwidth and power. As such, it may be desirable to reduce the time a user spends searching for relevant content in order to reduce the use of those computational resources. The provision of an explanation as to why content is being recommended to the user (e.g. why the content is relevant to the user) along with the recommended content may increase the likelihood of the user selecting content, which they might otherwise have overlooked. This may, for instance, if the selected content is of particular interest to the user, reduce the time and computational resources spent searching for alternatives to the recommended content.

Figure 1:
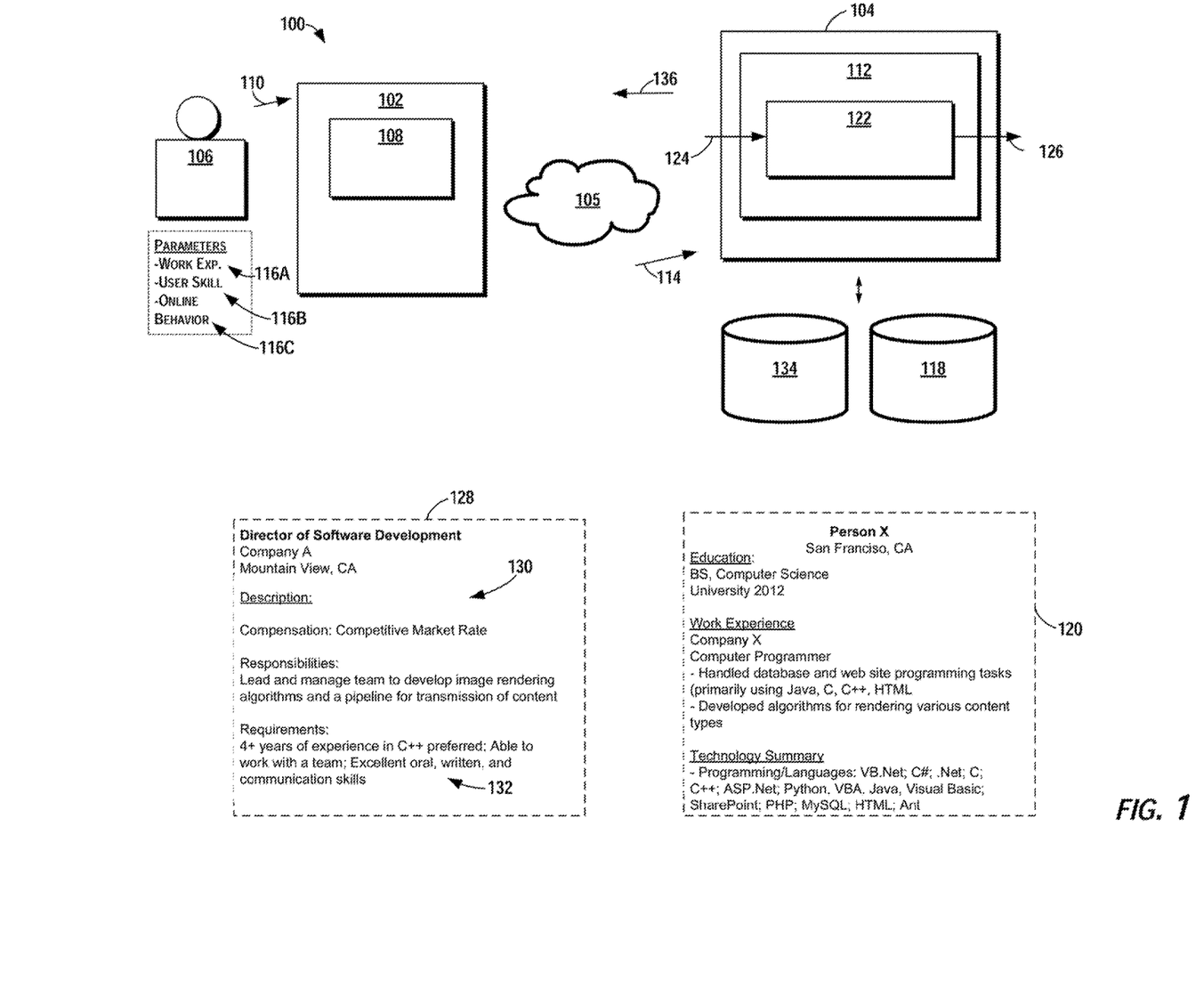
FIG. 1 depicts an example system for providing relevant explanations for recommended content according to example embodiments of the present disclosure.

With reference now to the FIGS., example embodiments of the present disclosure will be discussed in further detail. FIG. 1 depicts an example system 100 for providing relevant explanations for recommended content according to example embodiments of the present disclosure. The system 100 can include a user computing device 102 and a content recommendation system 104. The user computing device 102 and the content recommendation system 104 can be configured to communicate with one another via one or more wired and/or wireless network(s) 105. The network(s) 105 can include one or more public or private network(s), and can include the Internet. While the following description describes the operations and functions for providing relevant explanations for recommended content to a user as being performed by the content recommendation system 104, one or more of the operations and functions could also, or alternatively, be performed by the user computing device 102. Furthermore, the present disclosure is discussed herein with respect to an example implementation for recommending jobs. The systems and methods of the present disclosure can be implemented for other types of engagements.

The user computing device 102 can be utilized by a user 106. The user computing device 102 can include, for example, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, and/or any other type of mobile and/or non-mobile user computing device. The user computing device 102 can include various computing device(s) (e.g., including processors, memory devices, etc.) for performing operations and functions, as described herein.

The user computing device 102 can also include one or more display device(s) 108 (e.g., display screen) configured to display a user interface. The user interface can be a user interface that allows a user 106 to provide user input 110 such as, for example, a search query, an interface interaction (e.g., mouse click, tap), etc.

The content recommendation system 104 can be included with and/or remote from the user computing device 102. For example, in some implementations, the content recommendation system 104 can be a web-based server system. The content recommendation system 104 can include components for performing various operations and functions as described herein. For instance, the content recommendation system 104 can include one or more computing device(s) 112 (e.g., servers). As will be further described herein, the computing device(s) 112 can include one or more processor(s) and one or more memory device(s). The one or more memory device(s) can store instructions that when executed by the one or more processor(s) cause the one or more processor(s) to perform operations and functions for providing relevant explanations for recommended content.

The computing device(s) 112 can be configured to obtain data 114 indicative of one or more parameters 116A-C associated with a user 106. The parameter(s) 116A-C associated with the user 106 can include, for example, a work experience 116A associated with the user 106, one or more user skill(s) 116B associated with the user 106, online behavior 116C associated with the user 106, and/or other parameters associated with the user 106. To obtain such parameters, the computing device(s) 112 can be configured to access one or more databases 118 that store information associated with the user 106 (e.g., among a plurality of users). The one or more parameter(s) 116A-C associated with the user can be obtained via information, document, etc. uploaded by a user. For example, the computing device(s) 112 can access (e.g., via the databases 118) an electronic version of a resume 120 of the user 106, an online profile associated with the user 106, one or more previous job applications associated with the user 106, data indicative of the user's web history (e.g., search history, clicks, pages visited, likes, dislikes, social media follows, check-ins, etc.). In some implementations, the computing device(s) 112 can utilize one or more web-crawling techniques to obtain information about the user 106.

The computing device(s) 112 can be configured to process information associated with the user 106 to obtain the parameter(s) 116A-C associated with the user 106. For example, the computing device(s) 112 can process at least one of a resume 120 associated with the user 106 and/or an online profile associated with the user 106 to extract one or more parameters 116A-B (e.g., user skills in C++ programming, work experience as a computer programmer). To do so, the computing device(s) 112 can include various models for processing the information associated with the user 106. For example, the computing device(s) 116 can include a model 122 (e.g., a classifier model) configured to extract one or more parameters 116A-C (e.g., user skills) associated with a user 106 from information associated with the user (e.g., the resume of the user 120). The model 122 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. The model 122 can receive an input 124 including, at least, information associated with the user 106 (e.g., data indicative of the user's resume, online profile, online behavior). The model 122 can be trained to provide a model output 126 that is indicative of one or more parameters 116A-C associated with the user 106.

In some implementations, the computing device(s) 112 can infer one or more parameters for the user. For example, the computing device(s) 112 can process the work experience included in a user's resume 120 (and/or an online profile) to infer one or more user skills and/or certifications associated with the user 106. This can also be done using a look-up table that can be used to match terms/phrases from the user's work experience to one or more inferred skills. In some implementations, the computing device(s) 112 can utilize a model (e.g., machine-learned model) that is configured to receive an input indicative of information associated with the user 106 and provide an output indicative of one or more inferred parameters (e.g., inferred skills, certifications). By way of example, the computing device(s) 112 can process (e.g., using reference tables, classifier models) the work experience included in a user's resume 120 (e.g., "handled web site programming tasks") to infer that the user 106 likely has knowledge of Hyper Text Markup Language (HTML) commonly used to structure a web page.

The computing device(s) 112 can be configured to determine recommended content for the user 106. The recommended content can be associated with a recommended engagement for the user. An engagement can include a job (e.g., paid, unpaid, for hire, contracted, employment position, temporary position), a volunteer position, a contracted position, an arrangement to do something, an undertaking, a task undertaken for another (e.g., individual, entity), a hobby, other engagement, etc. for the user. In some implementations, the recommended engagement (e.g., recommended job) can be associated with a job posting 128 (e.g., included in an electronic document). The job posting 128 can include textual content 130 associated with a job (e.g., "Director of Software Development" for Company A). The textual content 130 can include one or more job characteristics associated with a job such as, for example, a job title, a location, a company, compensation, work environment, company overview, responsibilities, skills (e.g., preferred, recommended), etc. In some implementations, such content can be organized within the job posting 128 as separate sections. For instance, the job posting 128 can include one or more sections that indicate job skills 132 required and/or preferred for the associated job. The computing device(s) 112 can extract one or more job skills 132 (e.g., "4+ years' experience in C++ preferred") from a job posting 128 using a classifier model, similar to that of model 122.

The computing device(s) 112 can be configured to determine the recommended content for the user 106 based at least in part on the one or more parameters 116A-C associated with the user 106. For instance, the computing device(s) 112 can compare one or more of the parameters 116A-C associated with the user 106 to one or more job characteristics indicated in the job posting 128. The computing device(s) 112 can determine the recommended engagement (e.g., job) based at least part on the comparison of the parameters 116A-C associated with the user 106 to one or more job characteristics indicated in the job posting 128. By way of example, the computing device(s) 112 can compare a user skill 116B extracted from the user's resume 120 (e.g., C++ programming proficiency) to a job skill 132 extracted from the job posting 128 (e.g., 4+ years' experience in C++ preferred). In the event that the extracted user skills 116A are related to, similar to, match, etc. the job skills 132, the computing device(s) 112 can identify the job from the job posting 128 as a recommended engagement (e.g., a recommended job) for the user 106.

Additionally, or alternatively, the computing device(s) 112 can determine a recommended engagement for the user 106 based at least in part on a transition. The transition can be a commonly found transition from one engagement (e.g., job) to another engagement. For instance, the computing device(s) 112 can be configured to analyze a plurality of resumes, user profiles (e.g., of online job professional sites), job applications, etc. to determine a relationship between jobs within a certain industry and/or across industries. The content recommendation system can create a data structure (e.g., hierarchy, tree structure, other structure) that indicates the relatedness between different jobs types based at least in part on the analyzed data (e.g., job titles). The data structure can indicate the types of jobs typically held by an individual before transitioning and/or applying to a new job. The computing device(s) 112 can utilize such a data structure (e.g., stored in an accessible database) to determine a potential job transition for the user 106.

The computing device(s) 112 can be configured to determine a transition (e.g., job transition) for the user 106 based at least in part on one or more of the parameters 116A-C associated with the user 106. The transition can be indicative of a transition from a current engagement associated with the user (e.g., the user's current job, a past job) to a new engagement (e.g., new job). The computing device(s) 112 can determine the recommended engagement (e.g., recommended job) for the user 106 based at least in part on the transition (e.g., job transition). For example, the computing device(s) 112 can determine that individuals with computer programming experience often transition into director positions in the software development industry. In this way, the computing device(s) 112 can leverage job movement and/or hiring trends in common job transitions to help recommend relevant content (e.g., jobs) to a user 106.

The computing device(s) 112 can be configured to generate an explanation for the recommended content for the user 106 based at least in part on the one or more parameters 116A-C associated with the user 106. The explanation can be indicative of why the recommended engagement (e.g., recommended job) is recommended for the user 106. For example, the computing device(s) 112 can determine that a user 106 may be interested in a job for the "Director of Software Development" with Company A based, at least in part, on the work experience 116A of the user 106 (e.g., as computer programmer), one or more user skill(s) 116B of the user 106 (e.g., C++ proficiency), the online behavior 116C of the user 106 (e.g., search queries related to job openings in software development), etc. The explanation for the recommended content can be indicative of one or more of the parameters 116A-C associated with the user 106 (e.g., the user's skills associated C++ programming language). For example, the explanation as to why the recommended engagement (e.g., job) is being recommended to the user 106 can be that individuals familiar with C++ are commonly interested in jobs like a director position within the software development industry. Additionally, or alternatively, the explanation for the recommended content can be indicative of the transition (e.g., from the engagement associated with the user to the new engagement). For example, the explanation can be that individuals with computer programming experience often transition into director positions in the software development industry.

In some implementations, the explanation can be based at least in part on a predefined explanation. For instance, the computing device(s) 112 can be configured to access a database 134 that includes data indicative of a plurality of predefined explanations and/or templates for such explanations. The computing device(s) 112 can access these predefined explanations to help generate an explanation as to why recommended content is being recommended for a specific user 106. By way of example, a predefined explanation can include the follow template for when the explanation is based at least in part on a user skill 116B: "people familiar with <skill name> are interested in jobs like this."

Figure 2:
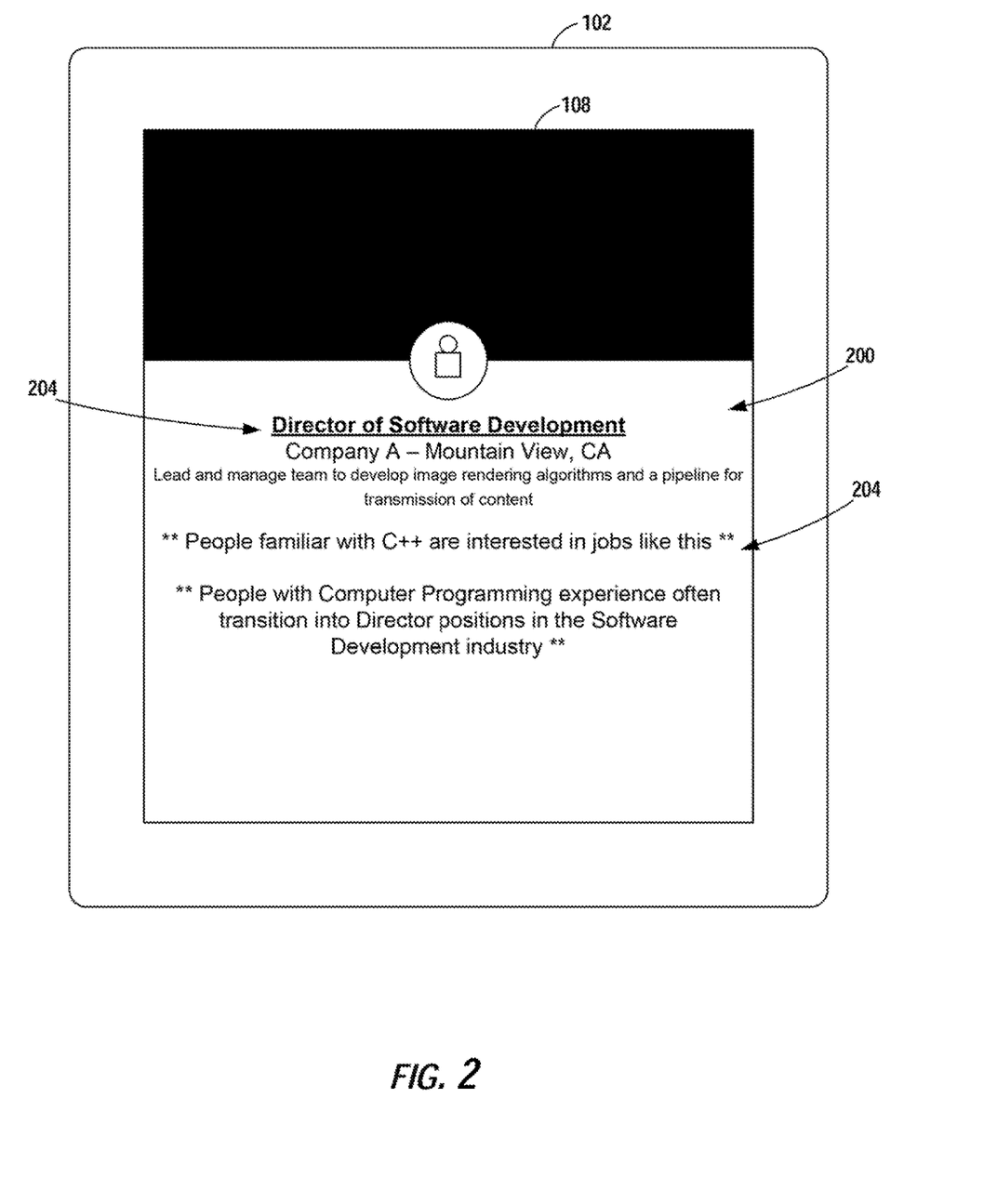
FIG. 2 depicts an example user interface according to example embodiments of the present disclosure.

The computing device(s) 112 can be configured to provide data 136 indicative of the recommended content and the explanation for the recommended content for display on a user interface via a display device 108. FIG. 2 depicts example user interface 200 according to example embodiments of the present disclosure. The computing device(s) 112 can provide data 136 indicative of the recommended content 202 (e.g., visual message indicative of the recommended engagement) and the explanation 204 for the recommended content (e.g., indicating why the recommended engagement is recommended for the user) for display on the user interface 200 via a display device 108 of the user computing device 102.

The explanation 204 for the recommended content can be indicative of one or more factors that were used to determine the recommended content 202. For instance, the explanation 204 for the recommended engagement (e.g., job) can be indicative of one or more parameters 116A-C associated with the user 106 that were used to determine the recommended engagement (e.g., job). By way of example, the explanation 204 can indicate to the user (e.g., via the user interface 200) that "People familiar with C++ are interested in jobs like this." This can indicate to the user 106 that one or more of the user's skills 116B were used in determining the recommended job for the user 106. Additionally, or alternatively, as shown in FIG. 2, the explanation 204 for the recommended engagement can be indicative of a transition. The transition (e.g., job transition) can be a transition from an engagement associated with the user 106 (e.g., a job, task, responsibility of the user) to a new engagement (e.g., a new job, task, responsibility of the user). For example, the user interface 200 can include a textual message explaining the transition: "People with Computer Programming experience often transition into Director positions in the Software Development industry." In this way, the explanation 204 can inform the user 106 of a common transition (e.g., job transition in the industry) that is applicable for the user 106. The explanation 204 can be based at least in part on a predefined explanation, as described herein.

In some implementations, the computing device(s) 112 can provide the data indicative of the recommended content 202 for selection by the user 106 via the user interface 200. For example, the recommended engagement can be associated with a link (e.g., hyperlink) to additional information, such as a corresponding job posting 128. The selection of the recommended engagement by the user 106 (e.g., via a mouse click, tap) can cause the display of the additional information (e.g., job posting 128 associated with the recommended job). For instance, the computing device(s) 112 can obtain data indicative of the user selection and provide data indicative of the job posting 128 for display via the display device 108.

Figure 3:
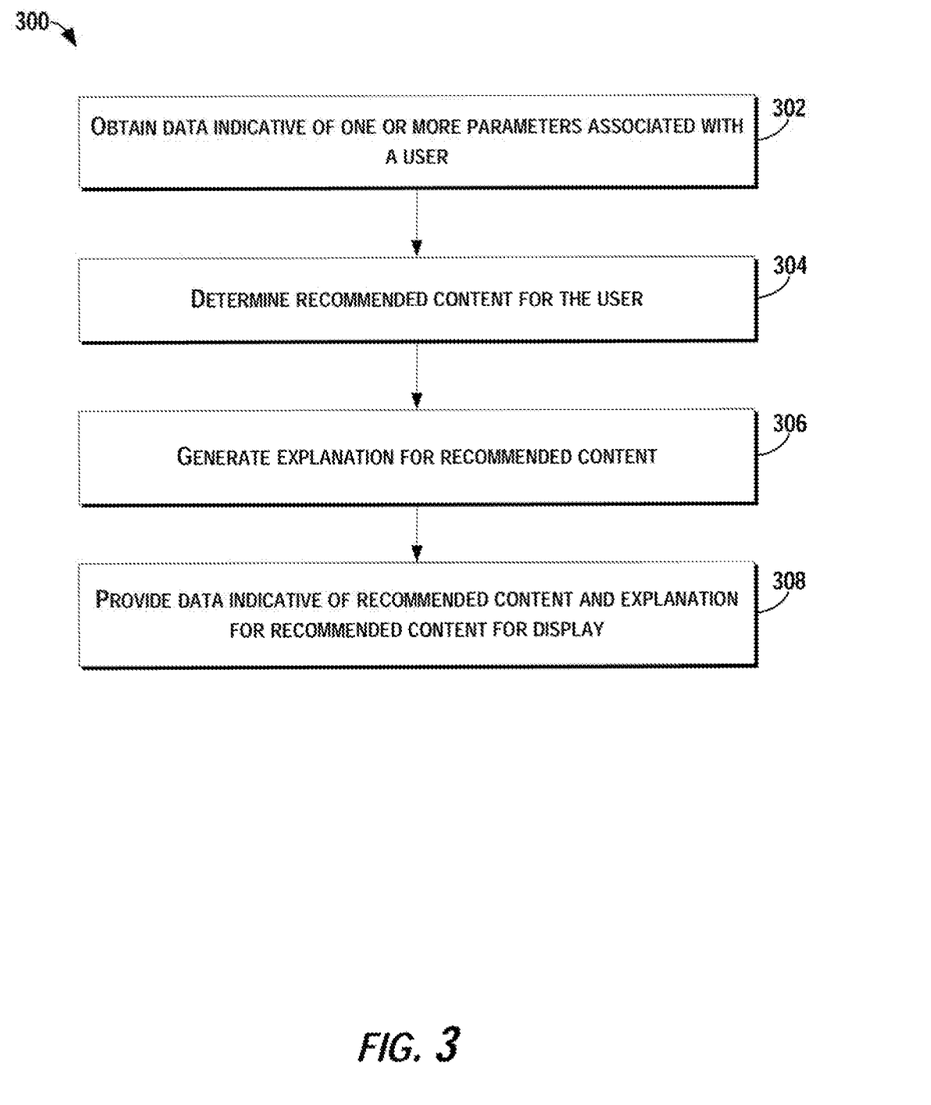
FIG. 3 depicts a flow diagram of an example method according to example embodiments of the present disclosure.

FIG. 3 depicts a flow chart of an example method 300 of providing relevant explanations for recommended content according to example embodiments of the present disclosure. One or more portion(s) of method 300 can be implemented by a user computing device (e.g., 102) and/or other computing device(s) (e.g., 112), such as, for example, those shown in FIGS. 1 and 5. One or more portion(s) of method 300 can be implemented as an algorithm on the hardware (e.g., computer components) of FIGS. 1 and 5 to perform the computer-implemented function(s) as set forth in the claims. FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The method 300 is described herein as being performed by the computing device(s) 112 for purposes of illustration. The method 300 can be performed by the user computing device 102.

At (302), the method 300 can include obtaining data indicative of one or more parameters associated with a user. The computing device(s) 112 can obtain data 114 indicative of one or more parameters 116A-C associated with a user 106. The one or more parameters 116A-C associated with the user 106 can include at least one of a work experience 116A associated with the user 106, a user skill 116B (e.g., explicit, inferred) associated with the user 106, and online behavior 116C associated with the user 106. The parameters can also, or alternatively, include other information associated with the user 106. The computing device(s) 112 can be configured to access information associated with the user 106 via one or more databases 118, via one or more web-crawl technique(s), and/or other processes. The one or more parameter(s) 116A-C associated with the user can be obtained via information, document, etc. uploaded by the user. In some implementations, to obtain the parameters 116A-C associated with the user 106, the computing device(s) 112 can input the information associated with the user 106 into a model 122 to extract the parameters 116A-C from the information. For example, the work experience 116A associated with the user 106 and/or the user skill 116B associated with the user 106 can be obtained via at least one of a resume 120 associated with the user 106 and a profile associated with the user 106 (e.g., an online profile in a social media site, job professional site).

At (304), the method 300 can include determining recommended content for the user. For instance, the computing device(s) 112 can determine recommended content 202 for the user 106 based at least in part on the one or more parameters 116A-C associated with the user 106. The recommended content 202 can include a recommended engagement for the user 106 (e.g., as shown in FIG. 2). In some implementations, the recommended engagement (e.g., job) can be associated with a job posting 128 (e.g., including one or more job characteristics associated with the recommended job). As described herein, the computing device(s) 112 can compare the user skill 116B associated with the user 106 to one or more job skills 132 associated with the job posting 128 to determine a recommended engagement (e.g., job). Additionally, or alternatively, the computing device(s) 112 can determine a transition (e.g., job transition) for the user 106 based at least in part on one or more of the parameters 116A-C associated with the user 106. The computing device(s) 112 can determine the recommended engagement (e.g., job) for the user 106 based at least in part on the transition (e.g., job transition), as described herein.

At (306), the method 300 can include generating an explanation for the recommended content. For instance, the computing device(s) 112 can generate an explanation 204 for the recommended content 202 for the user 106 based at least in part on the one or more parameters associated with the user 106. The explanation 204 can be indicative of why the recommended engagement is recommended for the user 106. For instance, the explanation 204 for the recommended content 202 can be indicative of a user skill 116B (e.g., C++ proficiency) associated with the user 106, that was used in determining the recommended engagement (e.g. "Direct of Software Development). Additionally, or alternatively, the explanation 204 for the recommended content 202 can be indicative of the transition, as shown for example in FIG. 2.

At (308), the method 300 can include providing data indicative of the recommended content and the explanation for the recommended content for display. For instance, the computing device(s) 112 can provide data 136 indicative of the recommended content 202 and the explanation 204 for the recommended content 202 for display on a user interface 200 via a display device 108. As described herein, the recommend content 202 may be interactive (e.g., a hyperlink) such that a user 106 can select the recommend content 202 to access additional information (e.g., a job posting). However, the explanation 204 for the recommended content 202 may not be interactive.

Figure 4:
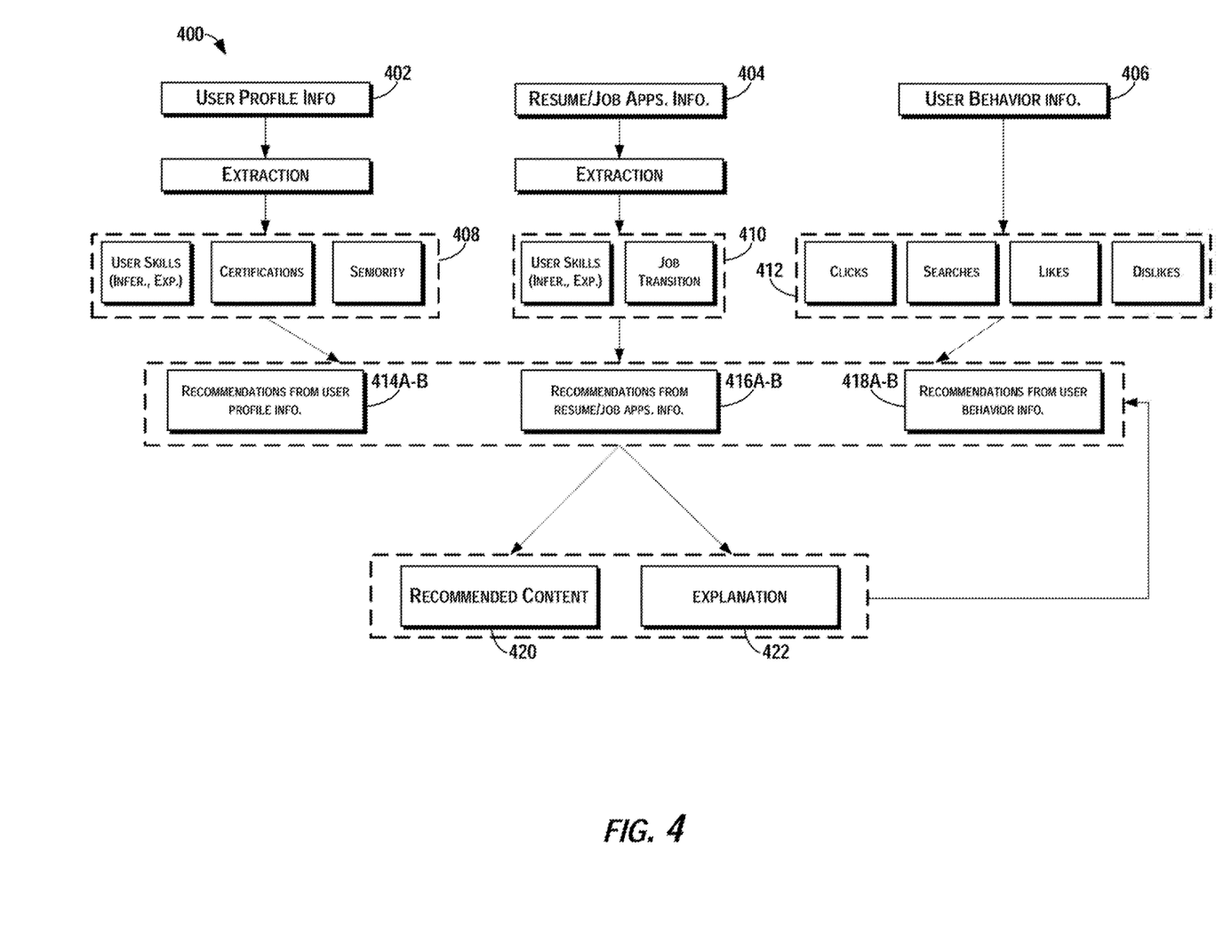
FIG. 4 depicts a flow diagram of another example method according to example embodiments of the present disclosure.
Figure 5:
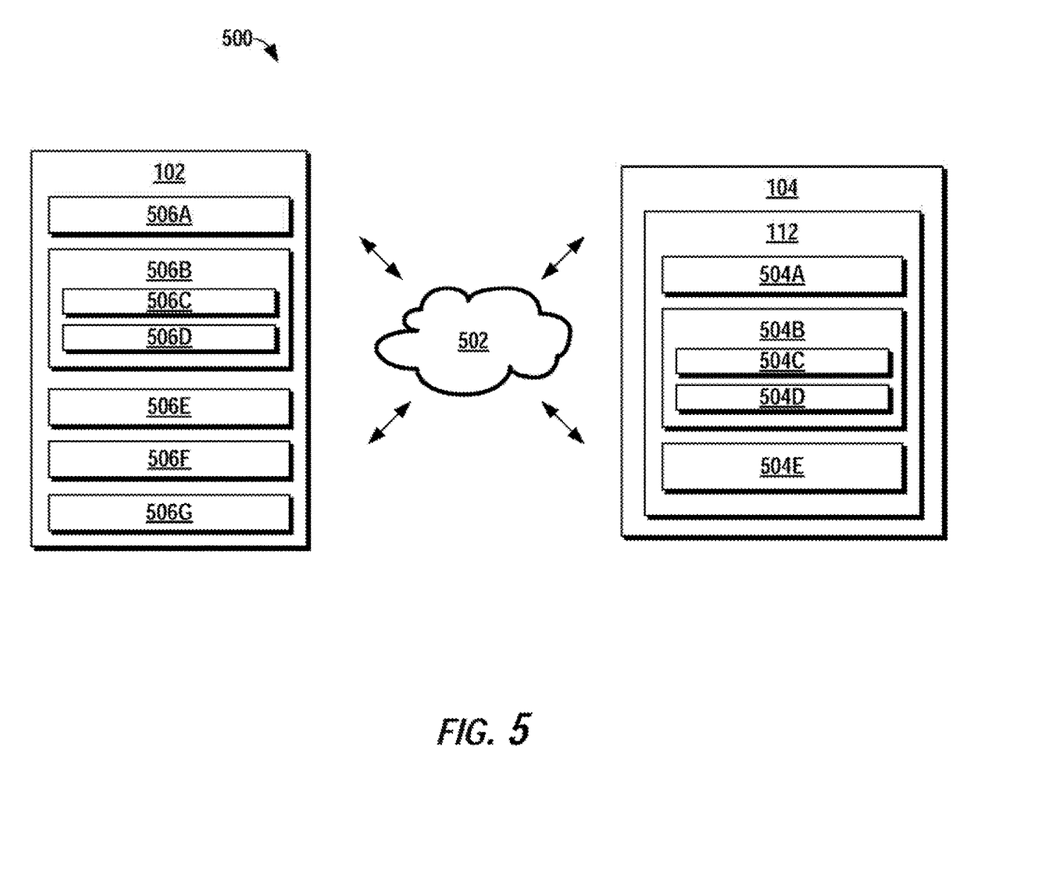
FIG. 5 depicts system components according to example embodiments of the present disclosure.

FIG. 4 depicts a flow diagram of an example method 400 of providing relevant explanations for recommended content according to example embodiments of the present disclosure. One or more portion(s) of method 400 can be implemented by a user computing device (e.g., 102) and/or other computing device(s) (e.g., 112), such as, for example, those shown in FIGS. 1 and 5. One or more portion(s) of method 400 can be implemented as an algorithm on the hardware (e.g., computer components) of FIGS. 1 and 5 to perform the computer-implemented function(s) as set forth in the claims. FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The method 400 is described herein as being performed by the computing device(s) 112 for purposes of illustration. The method 400 can be performed by the user computing device 102.

The computing device(s) 112 can gather various types of user information to generate highly user-specific and relevant recommendation explanations. For example, the computing device(s) 112 can obtain information 402 associated with a profile (e.g., an online user profile), information 404 associated with a resume and/or job application, and/or information 406 associated with online behavior. As described herein, the computing device(s) 112 can access one or more databases 118 that contain the information 402, 404, 406 and/or obtain such data via web-crawling techniques.

Each set of information 402, 404, 406 can also, or alternatively, include data for a plurality of users. For example, the information can include a plurality of profiles and/or resumes for a plurality of users. In some implementations, the computing device(s) 112 can apply its models (e.g., 122) to the plurality of profiles and/or resumes to help build an understanding of the overall topology of skills and transitions (e.g., job transitions), as described herein. By analyzing data for a plurality of users, the computing device(s) 112 can more readily determine commonly used terms/phrases (e.g., for skills) as well as trends (e.g., job transitions). For instance, the computing device(s) 112 can identify skills, each of which can be associated with one or more vectors. The computing device(s) can identify vectors of skills that are associated with specific job roles/titles (e.g., software developer roles are associated with skills such as "detail oriented", "C++", "Java") to help determine recommendations for a user 106 (e.g., by matching user skills and job skills). For instance, once the user skills (e.g., inferred, explicit), classifications, etc. are determined for a particular user, the vectors associated with the user skills can be compared with a larger dataset of previously determined skill vectors and job title transitions to determine personalized recommendations based on where a user fits into this dataset.

The computing device(s) can extract one or more parameters associated with the user from the information 402, 404, 406. For instance, the computing device(s) 112 can extract one or more parameters 408 from the information 402 associated with a profile of the user 106. By way of example, the computing device(s) 112 can extract (e.g., using the extraction models as described herein) one or more user skills (e.g., explicit, inferred), certifications, classifications of seniority, etc. from work experience described in a user profile. Additionally, or alternatively, the computing device(s) 112 can extract one or more parameters 410 from the information 404 associated with a resume and/or job application of the user 106. This can include, for example, one or more user skills (e.g., expressed by one or more vectors). The computing device(s) 112 can also process information associated with online behavior to determine one or more associated parameters 412 (e.g., clicks, searches, likes, dislikes). Such information may indicate a specific user's interests and/or an aggregate level of interest from a certain population of users (e.g., computer programmers).

The computing device(s) 112 can also determine one or more job transitions by analyzing the information 404 associated with a plurality of resumes and/or job applications (and/or the information 402). This can be done by analyzing the job titles of different positions held by different individuals to determine job-title trajectories. By analyzing the job-title trajectories (e.g., on resumes, professional site profiles), the computing device(s) 112 can identify vectors of skills associated with specific job titles, and job-titles that users have a high likelihood of moving into given their current title. This information can ultimately be used by the computing device(s) 112 to communicate that people with similar skills as a user regularly go into the type of job they are currently being recommended (e.g., as shown in FIG. 2).

In some implementations, the computing device(s) 112 can determine recommended content (and a corresponding explanation) for each type of source information 402, 404, 406. The computing device(s) 112 can determine recommended content 414A and an explanation 414B for the recommended content based on the information 402 associated with a user profile. Additionally, or alternatively, the computing device(s) 112 can determine recommended content 416A and an explanation 416B for the recommended content based on the information 404 associated with a resume and/or job application. The computing device(s) 112 can also, or alternatively, determine recommended content 418A and an explanation 418B for the recommended content based on the information 406 associated with online behavior (e.g., of the user 106).

The computing device(s) 112 can select one or more of the recommended content 414A, 416A, 418A to display for the user 106. For instance, in the event that the recommended content is the same for each type of source information, the computing device(s) 112 can select the recommended content to be displayed for a user 106. In the event that the recommended content is different across the various types of source information, the computing device(s) 112 can select the recommended content to be displayed for a user 106 based at least in part on a weighting, scoring, etc. For example, recommendations based on a user's resume and/or a job transition may be more likely to be relevant to a specific user. Accordingly, the computing device(s) 112 can be configured to give greater weight, score, etc. to the recommended content 416A (e.g., based on a user's resume, job transition) than the recommended content 416C (e.g., based on online behavior). In a similar manner, the computing device(s) 114 can select an explanation 414B, 416B, 418B for the recommended content to be displayed for a user 106 based at least in part on a weighting, scoring, etc. For example, the weighting, scoring, etc. can be based at least on the likelihood that the explanation is relevant to the specific user.

The computing device(s) 114 can provide data indicative of the selected recommended content 420 and the selected explanation 422 for display on a user interface (e.g., 200) via a display device (e.g., 108). As indicated herein, the selected explanation 422 can include the factors that were used to determine the selected recommended content 420 (e.g., identification of C++ skill on user's resume, knowledge of common job title transitions from programmer to director in the software development industry). As such, the systems and methods of the present disclosure allow it to become readily apparent to the user (e.g., job seeker) why a recommended content (e.g., recommended job) is relevant to the user given the user's skill set, work history, career trajectory, browsing history, etc. Moreover, the recommended content and/or the explanations can be feedback as another parameter associated with the user 106 for future recommendations, thus further fining tuning the recommendations for the user.

FIG. 5 depicts an example system 500 according to example embodiments of the present disclosure. The system 500 can include one or more user computing device(s) 102 and the content recommendation system 104. The content recommendation system 104 and the user computing device(s) 102 can be configured to communicate via one or more network(s) 502 (e.g., which can correspond to network(s) 105 shown in FIG. 1).

The content recommendation system 104 can include one or more computing device(s) 112. The computing device(s) 112 can include one or more processor(s) 504A and one or more memory device(s) 504B. The one or more processor(s) 504A can be any suitable processing device (e.g., a processor core, a microprocessor, an ASIC, a FPGA, a controller, a microcontroller, etc.) and can be one processor or a plurality of processors that are operatively connected. The memory device(s) 504B can include one or more non-transitory computer-readable storage media, such as RAM, ROM, EEPROM, EPROM, flash memory devices, magnetic disks, etc., and/or combinations thereof.

The memory device(s) 504B can store information accessible by the one or more processor(s) 504A, including computer-readable instructions 504C that can be executed by the one or more processor(s) 504A. The instructions 504C can be any set of instructions that when executed by the one or more processor(s) 504A, cause the one or more processor(s) 504A to perform operations. In some embodiments, the instructions 504C can be executed by the one or more processor(s) 504A to cause the one or more processor(s) 504A to perform operations, such as any of the operations and functions of the computing device(s) 112 and/or for which the computing device(s) 112 are configured, as described herein, the operations for providing relevant explanations for recommended content (e.g., one or more portions of methods 300, 400), and/or any other operations or functions, as described herein. The instructions 504C can be software written in any suitable programming language or can be implemented in hardware. Additionally, and/or alternatively, the instructions 504C can be executed in logically and/or virtually separate threads on processor(s) 504A.

The one or more memory device(s) 504B can also store data 504D that can be retrieved, manipulated, created, or stored by the one or more processor(s) 504A. The data 504D can include, for instance, data indicative of parameters associated with a user, user information (e.g., 402, 404, 406), data indicative of extracted information, data indicative of job postings, data indicative of recommended content, data indicative of explanations for recommended content, and/or other data or information described herein. The data 504D can be stored in one or more database(s). The one or more database(s) can be connected to the computing device(s) 112 by a high bandwidth LAN or WAN, or can also be connected to computing device(s) 112 through network(s) 502. The one or more database(s) can be split up so that they are located in multiple locales.

The computing device(s) 112 can also include a communication interface 504E used to communicate with one or more other component(s) of the system 500 (e.g., user computing device(s) 102) over the network(s) 502. The communication interface 504E can include any suitable components for interfacing with one or more network(s), including for example, transmitters, receivers, ports, controllers, antennas, or other suitable components.

The user computing device(s) 102 can be any suitable type of computing device, as described herein. A user computing device 102 can include one or more processor(s) 506A and one or more memory device(s) 506B. The one or more processor(s) 506A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 506B can include one or more non-transitory computer-readable storage medium(s), such as RAM, ROM, EEPROM, EPROM, flash memory devices, magnetic disks, etc., and/or combinations thereof.

The memory device(s) 506B can include one or more computer-readable media and can store information accessible by the one or more processor(s) 506A, including instructions 506C that can be executed by the one or more processor(s) 506A. For instance, the memory device(s) 506B can store instructions 506C for running one or more software applications, displaying a user interface, receiving user input, processing user input, etc. In some implementations, the instructions 506C can be executed by the one or more processor(s) 506A to cause the one or more processor(s) 506A to perform operations, such as any of the operations and functions of the user computing device(s) 102 and/or for which the user computing device(s) 102 are configured, the operations for providing relevant explanations for recommended content (e.g., one or more portions of methods 300, 400), and/or any other operations or functions, as described herein. The instructions 506C can be software written in any suitable programming language or can be implemented in hardware. Additionally, and/or alternatively, the instructions 506C can be executed in logically and/or virtually separate threads on processor(s) 506A.

The one or more memory device(s) 506B can also store data 506D that can be retrieved, manipulated, created, or stored by the one or more processor(s) 506A. The data 506D can include, for instance, data indicative of a user input, data indicative of a user interface and/or other data/information described herein. In some implementations, the data 506D can be received from another device.

The user computing device(s) 102 can also include a communication interface 506E used to communicate with one or more other component(s) of system 500 (e.g., computing device(s) 112) over the network(s) 502. The communication interface 506E can include any suitable components for interfacing with one or more network(s), including for example, transmitters, receivers, ports, controllers, antennas, or other suitable components.

The user computing device(s) 102 can include one or more input component(s) 506F and/or one or more output component(s) 506G. The input component(s) 506F can include, for example, hardware for receiving information from a user, such as a touch screen, touch pad, mouse, data entry keys, speakers, a microphone suitable for voice recognition, etc. The output component(s) 506G can include hardware for audibly producing audio content for a user. For instance, the output component 506G can include one or more speaker(s), earpiece(s), headset(s), handset(s), etc. The output component(s) 506G can include a display device (e.g., 108), which can include hardware for displaying a user interface and/or other information for a user. By way of example, the output component 506G can include a display screen, CRT, LCD, plasma screen, touch screen, TV, projector, and/or other suitable display components.

The network(s) 502 can be any type of communications network, such as a local area network (e.g. intranet), wide area network (e.g. Internet), cellular network, or some combination thereof and can include any number of wired and/or wireless links. The network(s) 502 can also include a direct connection between one or more component(s) of system 500. In general, communication over the network(s) 502 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein can be implemented using a single computing device or multiple computing devices (e.g., servers) working in combination. Databases and applications can be implemented on a single system or distributed across multiple systems. Distributed components can operate sequentially or in parallel.

Furthermore, computing tasks discussed herein as being performed at the computing system (e.g., a server system) can instead be performed at a user computing device. Likewise, computing tasks discussed herein as being performed at the user computing device can instead be performed at the computing system.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing relevant explanations for recommended content, comprising:
    inputting, by a one or more computing devices, information associated with a user into a machine-learned model that has been trained to receive the information as an input, and in response to receiving the information, output data indicative of one or more parameters associated with the user, wherein the one or more parameters associated with the user describe at least one of a certification of the user or a user skill of the user;
    receiving, by the one or more computing devices, as an output of the machine-learned model, the data indicative of one or more parameters associated with the user;
    determining, by the one or more computing devices, recommended content for the user based at least in part on the one or more parameters associated with the user, the recommended content being associated with a recommended engagement for the user;
    accessing, by the one or more computing devices, an explanation database comprising data indicative of a plurality of predefined templates to obtain a selected predefined template of the plurality of predefined templates;
    generating, by the one or more computing devices, an explanation for the recommended content for the user based at least in part on the one or more parameters associated with the user and the selected predefined template, wherein the explanation is indicative of why the recommended engagement is recommended for the user, and wherein the explanation comprises the selected predefined template and the at least one of the certification associated with the user or the user skill associated with the user; and
    providing, by the one or more computing devices the recommended content and the explanation for the recommended content including the predefined template and the at least one of the certification associated with the user or the user skill associated with the user.

2. The computer-implemented method of claim 1, wherein the information associated with the user is obtained via information uploaded by a user.

3. The computer-implemented method of claim 2, wherein the recommended engagement is associated with a job, and wherein determining, by the one or more computing devices, recommended content for the user based at least in part on the one or more parameters associated with the user comprises:
    comparing, by the one or more computing devices, the at least one of the certification associated with the user or the user skill associated with the user to one or more job skills included in a job posting associated with the job.

4. The computer-implemented method of claim 3, wherein the explanation for the recommended content is indicative of the at least one of the certification associated with the user or the user skill associated with the user.

5. The computer-implemented method of claim 1, wherein determining, by the one or more computing devices, the recommended content for the user based at least in part on the one or more parameters associated with the user comprises:
    determining, by the one or more computing devices, a transition for the user based at least in part on the one or more of the parameters associated with the user; and
    determining, by the one or more computing devices, the recommended engagement for the user based at least in part on the transition.

6. The computer-implemented method of claim 5, wherein the explanation for the recommended content is indicative of the transition.

7. The computer-implemented method of claim 1, wherein the one or more computing devices obtain the selected predefined template based at least in part on the one or more parameters associated with the user.

8. A computing system for providing relevant explanations for recommended content, comprising:
    one or more processors; and
    one or more memory devices, the one or more memory devices storing instructions that when executed by the one or more processors cause the one or more processors to perform operations, the operations comprising:
        inputting information associated with a user into a machine-learned model that has been trained to receive the information as an input, and in response to receiving the information, output data indicative of one or more parameters associated with the user, wherein the one or more parameters associated with the user describe at least one of a certification of the user or a user skill of the user;
        receiving, as an output of the machine-learned model, the data indicative of one or more parameters associated with the user;
        determining recommended content for the user based at least in part on the one or more parameters associated with the user, the recommended content being associated with a recommended engagement for the user;
        accessing an explanation database comprising data indicative of a plurality of predefined templates to obtain a selected predefined template of the plurality of predefined templates;
        generating an explanation for the recommended content for the user based at least in part on the one or more parameters associated with the user and the selected predefined template, wherein the explanation is indicative of why the recommended engagement is recommended for the user, and wherein the explanation comprises the predefined text of the selected template and the at least one of the certification associated with the user or the user skill associated with the user; and providing the recommended content and the explanation for the recommended content including the predefined template and the at least one of the certification associated with the user or the user skill associated with the user.

9. The computing system of claim 8, further comprising:
processing at least one of a resume associated with the user or an online profile associated with the user to obtain the information associated with the user.

10. The computing system of claim 9, wherein the recommended engagement is associated with a job posting comprising one or more job characteristics associated with a job, and wherein determining the recommended content for the user based at least in part on the one or more parameters associated with the user comprises:
comparing the one or more parameters associated with the user to the one or more job characteristics indicated in the job posting; and
determining the recommended engagement based at least part on the comparison of the one or more parameters associated with the user to the one or more job characteristics, wherein the recommended content is indicative of the job.

11. The computing system of claim 8, wherein determining recommended content for the user based at least in part on the one or more parameters associated with the user comprises determining the recommended content further based on a work experience associated with the user and online behavior associated with the user.

12. The computing system of claim 8, wherein the explanation for the recommended content is indicative of the one or more parameters associated with the user.

13. The computing system of claim 8, wherein determining the recommended content for the user based at least in part on the one or more parameters associated with the user comprises:
determining a job transition for the user based at least in part on the one or more parameters associated with the user; and
determining the recommended engagement for the user based at least in part on the job transition.

14. The computing system of claim 13, wherein the explanation for the recommended content is indicative of the job transition.

15. One or more tangible, non-transitory computer-readable media storing computer-readable instructions that when executed by one or more processors cause the one or more processors to perform operations, the operations comprising:
inputting information associated with a user into a machine-learned model that has been trained to receive the information as an input, and in response to receiving the information, output data indicative of one or more parameters associated with the user, wherein the one or more parameters associated with the user describe at least one of a certification of the user or a user skill of the user;
receiving as an output of the machine-learned model, the data indicative of one or more parameters associated with the user;
determining recommended content for the user based at least in part on the one or more parameters associated with the user, the recommended content being associated with a recommended engagement for the user;
accessing an explanation database comprising data indicative of a plurality of predefined templates to obtain a selected predefined template of the plurality of predefined templates;
generating an explanation for the recommended engagement for the user based at least in part on the one or more parameters associated with the user and the selected predefined template, wherein the explanation is indicative of why the recommended engagement is recommended for the user, and wherein the explanation comprises the selected predefined template and the at least one of the certification associated with the user or the user skill associated with the user; and
providing the recommended content and the explanation for the recommended content including the predefined template and the at least one of the certification associated with the user or the user skill associated with the user.

16. The one or more tangible, non-transitory computer-readable media of claim 15, wherein providing the recommended content and the explanation for the recommended content comprises:
providing the recommended content for selection by the user via the user interface.

17. The one or more tangible, non-transitory computer-readable media of claim 16, wherein selection of the recommended content causes the display of a job posting.

18. The one or more tangible, non-transitory computer-readable media of claim 16, wherein determining recommended content for the user based at least in part on the one or more parameters associated with the user comprises:
determining a transition for the user based at least in part on the one or more parameters associated with the user, wherein the transition is indicative of a job transition from a current engagement associated with the user to a new engagement; and
determining, by the one or more computing devices, the recommended content for the user based at least in part on the transition.

19. The one or more tangible, non-transitory computer-readable media of claim 18, wherein the explanation for the recommended content is indicative of the job transition from the current engagement associated with the user to the new engagement.

* * * * *